US005679286A

United States Patent [19]
Wollenweber

[11] Patent Number: 5,679,286
[45] Date of Patent: Oct. 21, 1997

[54] AQUEOUS DISPERSIONS OF ANTIFOAM AGENTS

[75] Inventor: Horst-Werner Wollenweber, Duesseldorf, Germany

[73] Assignee: Henkel Kommanditgesellschaft auf Aktien, Duesseldorf, Germany

[21] Appl. No.: 535,258

[22] PCT Filed: Apr. 19, 1994

[86] PCT No.: PCT/EP94/01208

§ 371 Date: Oct. 30, 1995

§ 102(e) Date: Oct. 30, 1995

[87] PCT Pub. No.: WO94/25137

PCT Pub. Date: Nov. 10, 1994

[30] Foreign Application Priority Data

Apr. 28, 1993 [DE] Germany ............ 43 13 947.7

[51] Int. Cl.$^6$ .................................. B01D 19/04
[52] U.S. Cl. ........................... 252/321; 252/358
[58] Field of Search ...................... 252/321, 358

[56] References Cited

U.S. PATENT DOCUMENTS 4,087,398  5/1978  Heyden et al. ............ 252/358
4,303,549  12/1981  Boylan ..................... 252/321
4,937,011  6/1990  Schmid et al. ............ 252/321

FOREIGN PATENT DOCUMENTS 2242541  8/1972  Germany.
2553990  6/1977  Germany.
3039393  4/1981  Germany.
3705896  8/1987  Germany.
9300144  1/1993  WIPO.
9309861  5/1993  WIPO.

OTHER PUBLICATIONS

Hawley's Condensed Chemical Dictionary, Tenth Edition, (Van Nostrand Reinhold Co, Inc., NY, NY) p. 1233, 1987.

Primary Examiner—Richard D. Lovering
Assistant Examiner—Daniel S. Metzmaier
Attorney, Agent, or Firm—Ernest G. Szoke; Wayne C. Jaeschke; Real J. Grandmaison

[57] ABSTRACT

An aqueous defoaming dispersion having a water phase and a dispersed phase, the dispersed phase containing;

(a) from 70 to 98% by weight of fatty alcohols having melting points above 40° C.; and (b) from 2 to 30% by weight of ketones having melting points above 45° C., all weights being based on the weight of the dispersed phase.

19 Claims, No Drawings

AQUEOUS DISPERSIONS OF ANTIFOAM AGENTS

This application is filed under 35 U.S.C. 371 and based on PCT/EP94/01208, filed 19 Apr., 1994.

BACKGROUND OF THE INVENTION

1. Field of Invention

This invention relates to aqueous dispersions of antifoam agents of which the dispersed phase contains fatty alcohols, ketones and optionally natural and/or synthetic waxes with certain melting points. The dispersions according to the invention are preferably used in papermaking.

The foaming associated with the presence or use of surface-active substances is a serious problem in a number of industrial processes. For example, in the production of paints and lacquers, especially waterborne paints, intensive foaming occurs through the stirring in of air when the formulation constituents are mixed together, i.e. during grinding of the lacquer. This foaming makes the production of paints and lacquers more laborious because the installations can only be filled and operated with a fraction of the available volume. At the same time, however, foaming can also occur when the user wants to apply lacquers and paints to substrates. Small air bubbles can be formed and represent not only optical surface defects, but also weak spots in the dried film because the bubbles can easily burst under impact.

Problematical foaming can also occur in papermaking on account of the air introduced into the water circuit. For example, foam marks can be left on the paper when foam passes with floated soil onto the paper web during sheet formation. In view of the growing increase in machine speeds, there is a greater danger of air entering the fiber suspension which can disrupt drainage of the paper stock on the paper machine and, ultimately, can lead to porous structures of the paper sheets. These basically known disadvantages are aggravated by the new paper machines with their closed water circuits because foam-forming and foam-stabilizing substances accumulate in the closed systems.

As the two examples clearly show, there is a considerable demand in industry for defoamers which would be capable of reducing foam already formed and for foam inhibitors which would suppress the formation of foam. In addition, antifoam agents are also supposed to drive air bubbles dissolved in liquid systems to the surface of the system—a process which plays an important part as degassing or even as deaeration, for example in lacquers. Accordingly, in the context of the present invention, antifoam agents are agents which are supposed both to reduce foam already formed and preventively to inhibit foaming and also to drive out air bubbles. These antifoam agents are expected to be effective in small quantities both in the short term and in the long term.

2. Discussion of Related Art

DE-A-30 39 393 describes an aqueous antifoam agent composition containing water, at least one higher aliphatic alcohol, at least one solid fatty acid, at least one soap of a solid fatty acid and surfactants. Although this antifoam agent is effective in the papermaking industry, there is still a need to provide even more effective antifoam agents in view of increasing requirements through faster machine speeds. In addition, the antifoam agents should only contain components which are toxicologically safe and readily biodegradable so that any antifoam agents entering the wastewater would not cause environmental problems. In addition, there was a need to find antifoam agents which would be effective at temperatures above 35° C., even in the closed systems now typical of papermaking. Since, in addition, the user requires antifoam agents which are ready for use and easy to dose, another problem addressed by the invention was to enable aqueous dispersions of the antifoam agents to be formulated.

DE-A-25 53 990 describes antifoam compositions for the paint, paper and food industries which are used in the form of aqueous dispersions and of which the dispersed wax-like phase contains ketones with melting points above 70° C. Other substances with a defoaming effect, such as fatty alcohols, may also be present in the dispersions. The fatty alcohols are not mentioned by name. Finally, there are also no examples in this document of aqueous dispersions of which the dispersed phase contains ketones and fatty alcohols. However, our own performance tests have shown that not all fatty alcohols in conjunction with ketones form good antifoam agents in the form of aqueous dispersions. On the contrary, it was found that the requirements listed above are only satisfied by antifoam agents which contain fatty alcohols, fatty ketones and optionally natural and/or synthetic waxes with melting points above 40°, 45° and 50° C.

DESCRIPTION OF THE INVENTION

The present invention relates to aqueous dispersions of antifoam agents of which the dispersed phase contains
a) fatty alcohols with melting points above 40° C. and
b) ketones with melting points above 45° C. and, optionally,
c) natural and/or synthetic waxes with melting points above 50° C.

The fatty alcohols present as component a) in the dispersed phase of the antifoam agent have melting points above 40° C. and preferably above 50° C. Saturated, linear and/or branched fatty alcohols containing 16 to 28 carbon atoms are preferred. Example of the linear fatty alcohols are palmityl, stearyl, arachidyl, behenyl, lignoceryl and ceryl alcohol and also 1-octacosanol. As usual in oleochemistry, the even-numbered fatty alcohols may also be used in the form of the technical cuts obtained, for example, by hydrogenation of rapeseed oil rich in erucic acid, peanut oil, beef tallow or fish oil, optionally after saturation of the unsaturated components. Apart from these alcohols, saturated, linear alcohols containing 16 to 28 carbon atoms obtainable by oxidation of aluminium alkyls an subsequent hydrolysis (Ziegler process) are also suitable for the purposes of the invention. Mixtures of even-numbered, linear fatty alcohols (alfols) are obtained in this way. Alcohols obtained by oxosynthesis, i.e. by reaction of olefins with carbon monoxide/hydrogen, such as odd-numbered and branched alcohols, are also suitable for the purposes of the invention.

Saturated unbranched fatty alcohols containing 18 to 22 carbon atoms and, in particular, mixtures of fatty alcohols containing between 10 and 50% by weight of stearyl alcohol are particularly preferred for the purposes of the invention.

The dispersions of antifoam agents contain ketones with melting points above 45° C. and preferably above 55° C. in the dispersed phase as another compulsory component. Saturated ketones which may be obtained by the relevant methods of organic chemistry are particularly suitable. They may be produced, for example, by pyrolysis of fatty acid magnesium salts at temperatures above 300° C. with elimination of carbon dioxide and water. If magnesium salts of a fatty acid are used as the starting material, symmetrical ketones are obtained. If, instead, mixtures of magnesium salts of different fatty acids are used, non-symmetrical ketones are formed. Ketones with melting points above 55° C. corresponding to formula (I): $R^1$—CO—$R^2$, where $R^1$ and $R^2$ independently of one another represent an alkyl radical containing 15 to 27 carbon atoms, are particularly suitable for the purposes of the invention. Examples of such ketones are 16-hentriacontanone (palmitone), 18-pentatriacontanone (stearone), 20-nonatriacontanone (arachinone) and 22-triatetracontanone (behenone).

As can be seen from the examples listed above, symmetrical ketones corresponding to formula (I) are particularly preferred.

The aqueous dispersions of antifoam agents may optionally contain natural and/or synthetic waxes in the dispersed phase. Particularly suitable synthetic waxes are those obtainable by hydrogenation of carbon monoxide (Fischer-Tropsch synthesis) or by polymerization of olefins.

Natural waxes in the context of the invention are both those obtainable in the processing of petroleum, bitumen and/or fossils, for example the paraffin waxes and montan waxes, and the natural esters of natural $C_{16-32}$ fatty acids or of natural $C_{16-32}$ fatty alcohols, such as stearyl stearate, stearyl behenate, behenyl behenate, carnauba wax, beeswax, etc. The natural waxes are particularly preferred for the purposes of the invention, standard paraffin waxes with melting points according to DIN 51570 above 50° to 85° C. being most particularly suitable.

The dispersed phases of the aqueous dispersions of antifoam agents typically contain 70 to 98% by weight of fatty alcohols of the described type, 2 to 30% by weight of ketones of the described type and 0 to 18% by weight of natural and/or synthetic waxes. Antifoam agent dispersions of which the dispersed phase contains 75 to 95% by weight of fatty alcohols, 2 to 15% by weight of ketones and 3 to 15% by weight of natural and/or synthetic waxes are particularly preferred.

The dispersions of antifoam agents typically contain the dispersed phase—based on 100% by weight of antifoam agent dispersion—in quantities of 5 to 40% by weight and preferably 10 to 35% by weight. The balance to 100% by weight is water and optionally dispersants.

To produce the aqueous dispersions of antifoam agents according to the invention, compounds a), b) and optionally c) together may be converted into a homogeneous melt and the melt thus formed stirred into water, the dispersions being formed through cooling of the melt. However, compounds a), b) and optionally c) may also be stirred into optionally heated water and the water kept at such temperatures until a melt is formed. In order to improve emulsification or dispersion, typical surfactants, such as anionic, cationic or nonionic compounds, may be added, preferably before cooling. 100 Parts by weight of the antifoam agent dispersions typically contain 0.5 to 5 parts by weight of such compounds acting as emulsifiers. Typical emulsifiers are the nonionic adducts of ethylene oxide with alcohols, alkylphenols (for example nonylphenol) and fatty acids, at least 5 moles of ethylene generally being added on per mole of compound. Examples of anionic emulsifiers are alcohol sulfates, alkylaryl sulfonates, ethoxylated alcohol sulfates, ethoxylated sulfates and ethoxylated sulfonates of alkylphenols, sulfonates of optionally condensed naphthalene, alkali metal salts of the sulfosuccinates and alkali metal phosphate esters.

If desired, typical additives, such as protective colloids and stabilizers, or even liquid fatty alcohols, fatty acids, fats, oils and silicone oils may be added to the aqueous dispersions of antifoam agents according to the invention to improve the consistency of the dispersed phase without impairing the effect.

The aqueous dispersions of antifoam agents according to the invention are convenient to use and easy to dose. They develop excellent foam-suppressing and foam-regulating effects, even at relatively high temperatures and against particularly obstinate foams of the type occurring in the paper industry. The effectiveness of the dispersions at relatively high temperatures is attributable inter alia to the coordinated melting points of the ketones and fatty alcohols of the antifoam agent dispersions. It is also remarkable that the small addition of ketones distinctly increases the effectiveness of the fatty alcohols.

The present invention also relates to the use of mixtures containing a) fatty alcohols with melting points above 40° C. and
b) ketones with melting points above 45° C. and, optionally,
c) natural and/or synthetic waxes with melting points above 50° C.

in the form of aqueous dispersions as antifoam agents. In general, the mixtures are added to the foam-forming aqueous systems in the form of aqueous dispersions in such a quantity that around 0.001 to 0.1 part by weight of the solid mixture is added per 100 parts by weight of a foam-forming aqueous medium. The quantities added are based on the solid mixture of ketone, fatty alcohol and, optionally, waxes and not on the aqueous dispersion. The mixtures are particularly suitable as aqueous antifoam agent dispersions in the paper industry where they may be used in any aqueous systems. The mixtures in the form of aqueous dispersions are used with particular preference as antifoam agents in the paper industry in aqueous systems with temperatures of at least 35° C., for example in the cooking of sulfite pulp and in the coating of paper. In paper manufacture, they may be used during the grinding and dispersion of paper stocks and pigments. It is of course also possible, however, to use the mixtures in the form of aqueous dispersions anywhere where foams occur and are to be prevented, for example in the food industry, in the starch industry, in sewage treatment plants and also in paints and lacquers.

In view of the particular application envisaged, the present invention also relates to a process for defoaming aqueous systems in the paper industry, characterized in that mixtures containing a) fatty alcohols with melting points above 40° C. and
b) ketones with melting points above 45° C. and, optionally,
c) natural and/or synthetic waxes with melting points above 50° C.

are added to the aqueous systems in the form of aqueous dispersions.

EXAMPLES

A) Production of the Aqueous Dispersions of Antifoam Agents According to the Invention Example A1)

713 g of deionized water were heated with stirring to 80° C. Quantities of 6 g of an adduct of 14 moles of ethylene oxide with technical oleic acid and of an adduct of 5.5 moles of ethylene oxide with tallow fatty acid were then successively added with slow stirring as emulsifiers. 162.0 g of a technical $C_{18-22}$ fatty alcohol mixture (composition of the alcohol in % by weight: 2 to 4 $C_6$; 15 to 20 $C_{18}$; 35 to 45 $C_{20}$; 23 to 45 $C_{22}$ and 1 to 2 $C_{24}$; hydroxyl value OHV according to DIN 53240=180 to 185 and iodine value IV according to DGF CV, 11b=2) and 18.0 g of stearone were then successively stirred in. The reaction mixture as a whole was then heated to 80° C. and stirred until all the constituents had dissolved and an emulsion was obtained. The reaction mixture was then rapidly cooled, resulting in formation of the dispersion.

Example A2)

As in Example A1), quantities of 6 g of the adducts described in A1) as emulsifiers and 162 g of a rapeseed oil fatty alcohol (composition in % by weight: 4 $C_{16}$; 34 $C_{18}$; 7 $C_{20}$; 55 $C_{22}$) and 18 g of stearone were added to 713 g of deionized water.

Example A3)

As in Example A1), 2.4 g of the emulsifiers described in Example A1) were added to 307.2 g of deionized water. 79.2 g of the technical $C_{18-22}$ fatty alcohol mixture and 8.8 g of stearone were then successively stirred in.

Comparison Examples

Comparison C1)

As in Example A1, quantities of 6 g of the emulsifiers described in Example A1) and 180 g of the technical $C_{18-22}$ fatty alcohol mixture described in Example A1) were added to 713 g of deionized water. No ketone was added.

Comparison C2)

As in Example A2), quantities of 6 g of the emulsifiers described in Example A1) and 180 g of the rapeseed oil fatty alcohol described in Example A2) were added to 713 g of deionized water. No ketones were added.

Comparison C3)

As in Example A3), quantities of 2.4 g of the emulsifiers described in Example A1) and 88 g of the technical $C_{18-22}$ fatty alcohol mixtures described in Example A1) were added to 307.2 g of deionized water. No ketone was added.

Comparison C4)

As in Example A1), quantities of 2.4 g of the emulsifiers described in Example A1) and 79.2 g of a $C_{14}$ fatty alcohol with a melting range of 33° to 37° C. and 8.8 g of stearone were added to 307.2 g of deionized water.

Comparison C5)

As Comparison Example C4), but with 88 g of the technical fatty alcohol mixture and no stearone.

B) Application

The antifoam agent dispersions A1), A2) and Comparison C1) and Comparison C2) were added in quantities of 200 µl to 1 liter of a 7.5% by weight calcium lignin sulfonate solution which had been heated to 45° or 55° C. The solution was continuously stirred at 1000 r.p.m. in a glass frit apparatus while air was introduced at a rate of 400 liters per hour. The time (in seconds) after which the solution together with the foam formed assumed a volume of 4.5 liters was measured. The antifoam agent dispersion is more effective, the longer the time required to reach the total volume.

The antifoam agent dispersion A3) and the other comparison dispersions were tested by the above method. However, 150 µl of dispersion were added, air was introduced at a rate of 600 liters per hour and the test was carried out at temperatures of 40° C. and 60° C. until a total volume of solution and foam of 5 liters was reached. The test results are set out in the following Table.

| Examples | 4.5 l Foam volume in seconds | |
|---|---|---|
| | 45° C. | 55° C. |
| A 1) | 500 | 167 |
| A 2) | 367 | 152 |
| C 1) | 307 | 100 |
| C 2) | 288 | 85 |

| Examples | 5 l Foam volume in seconds | |
|---|---|---|
| | 40° C. | 60° C. |
| A 3) | 220 | 55 |
| C 3) | 110 | 35 |
| C 4) | 55 | 45 |
| C 5) | 50 | 25 |

The above Table shows that the combinations of fatty alcohol and ketone in the aqueous dispersions are better than the pure fatty alcohols in the dispersion (see Example A1), A2) by comparison with Comparison Examples C1) and C2)). The Table also shows that aqueous dispersions containing relatively short-chain fatty alcohols with relatively low melting points together with ketones (C4) are distinctly poorer in their defoaming effect than Example A3).

I claim:

1. A process for defoaming a foam-producing aqueous system comprising adding to said foam-producing aqueous system a defoaming effective amount of an aqueous defoaming dispersion, said aqueous defoaming dispersion consisting of a water phase and 5% to 40% by weight of a dispersed phase, said dispersed phase consisting of:

(a) from 70 to 98% by weight of $C_{16}$–$C_{28}$ fatty alcohols having melting points above 40° C.; and
   (b) from 2 to 30% by weight of ketones having melting points above 45° C.; optionally
   (c) up to 18% by weight of waxes having melting points above 50° C., said waxes being selected from the group consisting of natural waxes, synthetic waxes, and mixtures thereof, based on the weight of said dispersed phase;

said dispersions further optionally contain an additive selected from the group consisting of emulsifiers and protective colloids.

2. The process of claim 1 wherein said fatty alcohols are selected from the group consisting of saturated linear fatty alcohols, saturated branched fatty alcohols, and mixtures thereof.

3. The process of claim 2 wherein said fatty alcohols have melting points above 50° C.

4. The process of claim 1 wherein said ketones have a melting point above 55° C. and correspond to formula (I):

$$R^1-CO-R^2 \quad (I)$$

wherein $R^1$ and $R^2$, independently of one another, represent an alkyl radical having from 15 to 27 carbon atoms.

5. The process of claim 1 wherein said dispersed phase further consist of said waxes.

6. The process of claim 5 wherein said waxed consist of paraffin waxes.

7. The process of claim 5 wherein said dispersed phase consist of from 75 to 95% by weight of said fatty alcohols, from 2 to 15% by weight of said ketones, and from 3 to 15% by weight of said waxes, all weights being based on the weight of said dispersed phase.

8. The process of claim 1 wherein from about 0.001 to 0.1 parts by weight of said dispersed phase, per 100 parts by weight of foam-producing aqueous system are added to said foam-producing aqueous system.

9. The process of claim 1 wherein said aqueous defoaming dispersion contains an additive selected from the group consisting of emulsifiers, protective colloids, and mixtures thereof.

10. The process of claim 1 wherein said foam-producing aqueous system comprises a paper manufacturing system.

11. The process of claim 1 wherein said foam-producing aqueous system is selected from the group consisting of a food industry system, starch industry system, sewage treatment system, and paint manufacturing system.

12. An aqueous defoaming dispersion consisting of a water phase and 5% to 40% by weight of a dispersed phase, said dispersed phase consisting of:

(a) from 70 to 98% by weight of $C_{16}$–$C_{28}$ fatty alcohols having melting points above 40° C.;

(b) from 2 to 30% by weight of ketones having melting points above 45° C.; optionally (c) up to 18% by weight of waxes having melting points above 50° C., said waxes being selected from the group consisting of natural waxes, synthetic waxes, and mixtures thereof, based on the weight of said dispersed phase;

said dispersions further optionally contain an additive selected from the group consisting of emulsifiers and protective colloids.

13. The dispersion of claim 12 wherein said fatty alcohols are selected from the group consisting of saturated linear fatty alcohols, saturated branched fatty alcohols, and mixtures thereof.

14. The dispersion of claim 13 wherein said fatty alcohols have melting points above 50° C.

15. The dispersion of claim 12 wherein said ketones have a melting point above 55° C. and correspond to formula (I):

$$R^1\text{---}CO\text{---}R^2 \qquad (I)$$

wherein $R^1$ and $R^2$, independently of one another, represent an alkyl radical having from 15 to 27 carbon atoms.

16. The dispersion of claim 12 wherein said dispersed phase further consist of said waxes.

17. The dispersion of claim 16 wherein said waxes consist of paraffin waxes.

18. The dispersion of claim 16 wherein said dispersed phase consists of said fatty alcohols in an amount of from 75 to 95% by weight, said ketones in an amount of from 2 to 15% by weight, and said waxes in an amount of from 3 to 15% by weight, all weights being based on the weight of said dispersed phase.

19. The dispersion of claim 12 further containing an additive selected from the group consisting of emulsifiers, protective colloids, and mixtures thereof.

* * * * *